US010744957B2

(12) United States Patent
Oikawa et al.

(10) Patent No.: US 10,744,957 B2
(45) Date of Patent: Aug. 18, 2020

(54) PHOTOGRAPHING APPARATUS FOR VEHICLE AND HEATING DEVICE

(71) Applicant: TOYOTA JIDOSHA KABUSHIKI KAISHA, Toyota-shi, Aichi-ken (JP)

(72) Inventors: Yoshitaka Oikawa, Toyota (JP); Yasuyoshi Seto, Toyota (JP); Ryuuichi Shinkai, Toyota (JP); Hideyuki Murasato, Toyota (JP); Hirotaka Hatakeyama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/177,498

(22) Filed: Nov. 1, 2018

(65) Prior Publication Data
US 2019/0193647 A1 Jun. 27, 2019

(30) Foreign Application Priority Data

Dec. 27, 2017 (JP) .................................. 2017-250526

(51) Int. Cl.
*H04N 5/225* (2006.01)
*B60R 11/04* (2006.01)
(Continued)

(52) U.S. Cl.
CPC .............. *B60R 11/04* (2013.01); *G01K 13/02* (2013.01); *G03B 17/55* (2013.01); *H04N 5/22521* (2018.08); *H05B 3/84* (2013.01)

(58) Field of Classification Search
CPC .... H04N 5/22521; B60R 11/04; G01K 13/02; G03B 17/55; H05B 3/84
(Continued)

(56) References Cited

U.S. PATENT DOCUMENTS 10,232,680 B2* 3/2019 Park ................... B60H 1/00849
2013/0219742 A1* 8/2013 Field .................... B60S 1/0848
34/491

(Continued)

FOREIGN PATENT DOCUMENTS

JP 2014101004 A * 6/2014
JP 2014101004 A 6/2014
(Continued)

*Primary Examiner* — Michael Lee
(74) *Attorney, Agent, or Firm* — Sughrue Mion, PLLC

(57) ABSTRACT

A photographing apparatus for vehicle includes a photographing apparatus, heating means, an outside air temperature detector, and a control device. The photographing apparatus is disposed inside a vehicle so as to face a window of the vehicle and is configured to receive photographing light passing through the window. The heating means is disposed inside the vehicle so as to face the window and generates heat when receiving electricity. The outside air temperature detector detects outside air temperature which is air temperature outside of the vehicle. The control device calculates an amount corresponding to a target value of electric energy to be supplied to the heating means for a predetermined period of time based on the outside air temperature detected by the outside air temperature detector and temperature of the photographing apparatus, the control device supplying electric energy corresponding to the target value to the heating means.

5 Claims, 10 Drawing Sheets

(51) Int. Cl.
*G01K 13/02* (2006.01)
*G03B 17/55* (2006.01)
*H05B 3/84* (2006.01)

(58) Field of Classification Search
USPC .................................................. 348/184, 148
See application file for complete search history.

(56) References Cited

U.S. PATENT DOCUMENTS

| | | |
|---|---|---|
| 2016/0231527 A1* | 8/2016 | Tremblay ............... G02B 7/028 |
| 2017/0113512 A1* | 4/2017 | Park ......................... B60J 7/057 |
| 2017/0240138 A1 | 8/2017 | Mori et al. |
| 2017/0295610 A1 | 10/2017 | Usami et al. |
| 2017/0334364 A1 | 11/2017 | Usami et al. |
| 2018/0056942 A1* | 3/2018 | Oikawa ................... B60S 1/586 |
| 2018/0149827 A1* | 5/2018 | Fechner ................. G02B 13/06 |
| 2019/0193684 A1* | 6/2019 | Oikawa ................... B60S 1/026 |

FOREIGN PATENT DOCUMENTS

| | | |
|---|---|---|
| JP | 2017144937 A | 8/2017 |
| JP | 2017-185896 A | 10/2017 |
| JP | 2017-206098 A | 11/2017 |

* cited by examiner

PHOTOGRAPHING APPARATUS FOR VEHICLE AND HEATING DEVICE

BACKGROUND OF THE INVENTION

1. Field of the Invention

The present invention relates to a photographing apparatus for vehicle and a heating device which are, for example, provided behind a front window of a vehicle.

2. Description of the Related Art

A camera may be provided behind a front window of a vehicle. The camera converts reflected light (object image) reflected by an object (for example, a vehicle) positioned in front of the vehicle into imaging data (electric signal) by an image pickup device, and transmits the imaging data to a control device of the vehicle.

Incidentally, at low outside air temperature (i.e., temperature outside of the vehicle), when an air heating device is used inside the vehicle, dew condensation may be generated on the front window. Further, when the outside air temperature is low, ice and/or frost may adhere to the outer surface of the front window. When such a phenomenon occurs on the front window, an imaging data produced by the image pickup device of the camera may be data indicating a blurred object image, or the image pickup device may fail to capture an object in front of the vehicle.

Thus, a heater being a heating wire and a heated portion, which the heater is fixed to and gives heat received from the heater to the front window as radiation heat, are provided behind the front window of the vehicle (i.e., provided inside the vehicle) disclosed in Japanese Unexamined Patent Application Publication No. 2017-185896.

This heater is connected to an electric power source of the vehicle via electrical supply lines. When the electric power of the electric power source is supplied to the heater, the heater generates heat. The heated portion is heated by the heat generated by the heater, and the radiation heat generated by the heated portion is given to the front window. When the temperature of the heater becomes a value within a predetermined temperature range, the temperature of the front window becomes equal to or higher than the dew point temperature. As a result, the dew condensation occurring on the front window disappears. Furthermore, ice and frost adhering to the outside surface of the front window disappear.

Therefore, when the front window is heated by the heater and the heated portion, the risk that the image pickup device captures a blurred object image or fails to capture an object image can be reduced.

SUMMARY OF THE INVENTION

Outside air temperature and vehicle speed have a correlation with the temperature of the front window which is heated by the heater. Therefore, the heat generation amount of the heater for causing the temperature of the heater to be a value within the predetermined temperature range can be calculated based on, for example, an outside air temperature and a vehicle speed which are detected before electricity is supplied to the heater.

However, the temperature of the heater is affected by factors other than the outside air temperature and the vehicle speed in addition to the outside air temperature and the vehicle speed. That is, since the heater is located close to the camera, the heater receives heat generated by the camera, and thus the temperature of the heater rises due to this heat. Therefore, if the heat generation amount to be generated by the heater is calculated without considering the heat generated by the camera, there is a possibility that a component located in the vicinity of the heater may be deformed.

The present invention has been made in order to cope with the above-mentioned problem. That is, the present invention has an object to provide a photographing apparatus for vehicle and a heating device which can cause heating means to generate heat considering heat given to the heating means from a photographing apparatus.

In order to achieve the object, the photographing apparatus for vehicle according to the present invention comprises:

a photographing apparatus (30) that is disposed inside a vehicle so as to face a window (85) of the vehicle and is configured to receive photographing light passing through the window;

heating means (41a, 43b) that is disposed inside the vehicle so as to face the window and generates heat when receiving electricity;

an outside air temperature detector (101) that detects outside air temperature which is air temperature outside of the vehicle; and a control device (100) that calculates an amount (Etc) corresponding to a target value of electric energy to be supplied to the heating means for a predetermined period of time (T) based on the outside air temperature detected by the outside air temperature detector and temperature of the photographing apparatus, the control device supplying electric energy corresponding to the target value to the heating means.

In order to achieve the object, the heating device (95) according to the present invention, which is disposed inside a vehicle so as to face a window of the vehicle together with a photographing apparatus, the heating device comprises:

heating means that generates heat when receiving electricity; and a control device that calculates an amount corresponding to a target value of electric energy to be supplied to the heating means for a predetermined period of time based on outside air temperature which is air temperature outside of the vehicle and temperature of the photographing apparatus, the control device supplying electric energy corresponding to the target value to the heating means.

The temperature of the heating means has a correlation with heat generation amount for a predetermined period of time. The temperature of the heating means is affected not only by the outside air temperature but also by the temperature of the photographing apparatus. That is, the temperature of the heating means rises due to the heat generated by the photographing apparatus. Therefore, when the control device reduces the heat generation amount to be generated by the heating means by an amount corresponding to the temperature of the photographing apparatus and supplies electricity to the heating means so that the heating means generates this reduced heat generation amount, a possibility of the heating means generating an excessive heat becomes small.

In one of aspects of the present invention, the heating means comprises:

a heater (43b), being a heating wire, generating heat when receiving electricity; and a heated portion (41a) to which the heater is fixed, the heated portion releasing radiation heat to the window when receiving heat from the heater.

According to this aspect, the heating means having a simple structure can be obtained.

In one of aspects of the present invention, the photographing apparatus for vehicle further comprises:

an interior air temperature detector (103) that detects interior air temperature which is air temperature inside of the vehicle; and the control device that supplies electric energy, whose amount corresponding to the target value is increased by an amount ($\Delta Ti$) corresponding to the interior air temperature, to the heating means.

In one of aspects of the present invention, the photographing apparatus for vehicle further comprises:

an air conditioner operating condition detector (104) that detects operating condition of an air conditioner provided in the vehicle; and the control device that supplies electric energy, whose amount corresponding to the target value is increased by an amount ($\Delta Sc$) corresponding to the operating condition, to the heating means.

The temperature (heat generation amount) of the heating means is also affected by the interior air temperature and the operating condition of the air conditioner. More specifically, the temperature (heat generation amount) of the heating means is lowered due to the influence of the interior air temperature and/or the operating condition of the air conditioner. Therefore, when the control device supplies electric energy, whose amount corresponding to the target value is increased by an amount corresponding to the interior air temperature and/or the operating condition of the air conditioner, to the heating means, the possibility of the heating means generating an excessive heat becomes smaller.

In the above description, names and references used in the following descriptions regarding embodiments are added with parentheses to the elements of the present invention, in order to understand the invention. However, those names and references should not be used to limit the scope of the present invention. Other objects, other features, and accompanying advantages of the present invention are easily understood from the description of embodiments of the present invention to be given referring to the following drawings.

DETAILED DESCRIPTION OF THE PREFERRED EMBODIMENTS

Hereinafter, a photographing apparatus for vehicle (including a heating device) according to an embodiment of the present invention will be described with reference to the accompanying drawings.

(Configuration)

Figure 1:
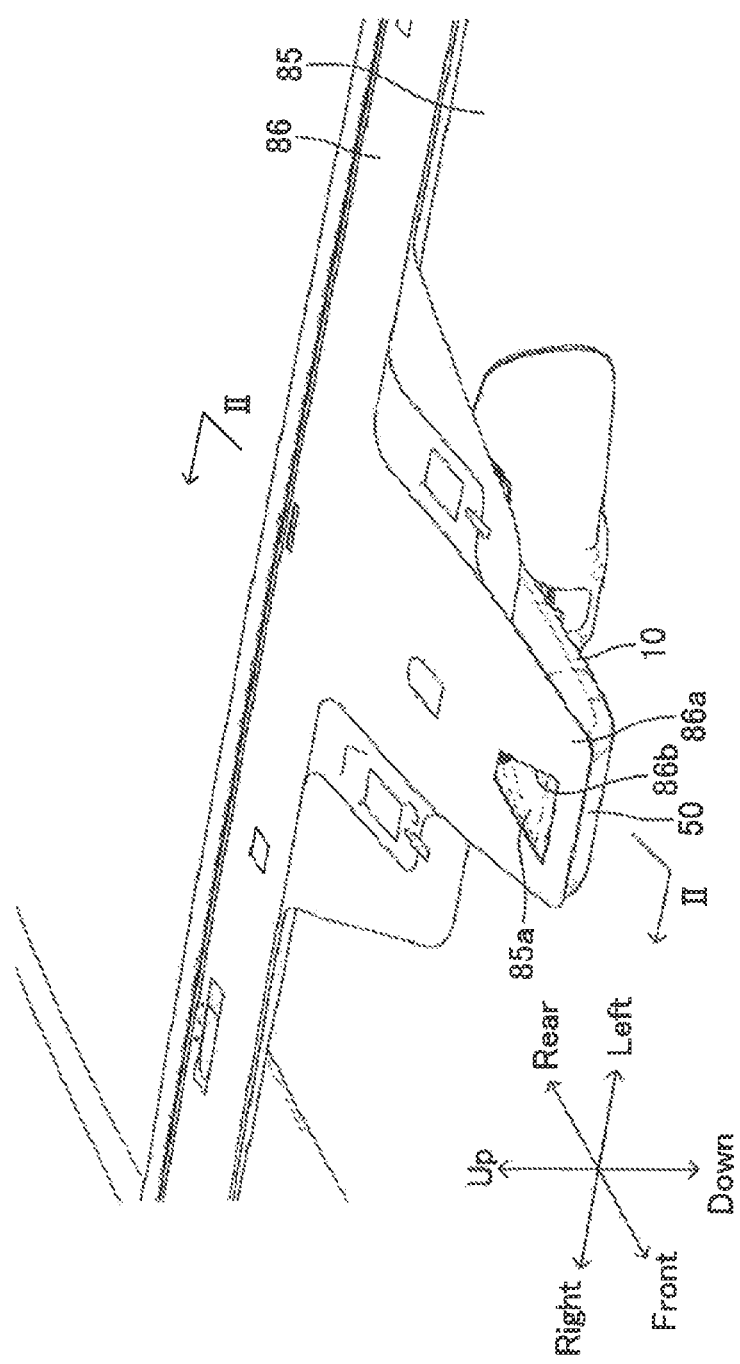
FIG. 1 is a perspective view of a photographing apparatus for vehicle and a front window according to an embodiment of the present invention as viewed from the front.
Figure 2:
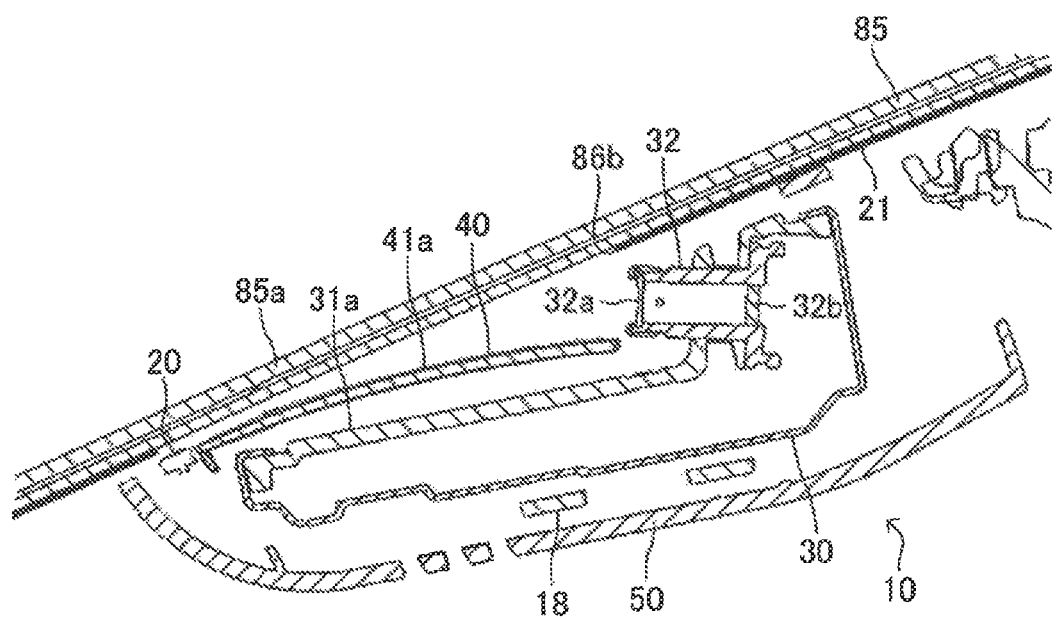
FIG. 2 is a cross-sectional view taken along line II-II in FIG. 1.

As shown in FIG. 1, a photographing apparatus for vehicle 10 (hereinafter referred to as a "photographing apparatus 10") according to the embodiment is provided behind a front window 85 of a vehicle (i.e., provided inside the vehicle). The front window 85 is made from translucent glass. The front window 85 may be made from a material (for example, resin) other than glass as long as it has translucency. As shown in FIG. 2, the front window 85 is inclined with respect to the vehicle body in such a manner that the front window 85 gradually heads toward the front of the vehicle as approaching the lower end thereof from the upper end thereof.

As shown in FIG. 1, a light shielding sheet 86 having a substantially T-shape in its entire shape is attached to an upper edge portion and its vicinity of the rear surface (that is, a surface on the vehicle interior side) of the front window 85. At the central portion of the light shielding sheet 86, a forward extending portion 86a extending forward and obliquely downward is formed. A light transmission hole 86b having a substantially trapezoidal shape is formed in the vicinity of the front end of the forward extending portion 86a. A portion of the front window 85 which faces the light transmission hole 86b is a light transmission portion 85a. The photographing apparatus 10 is provided behind the front window 85 (i.e., inside the vehicle) so as to face the light transmission portion 85a.

Figure 3:
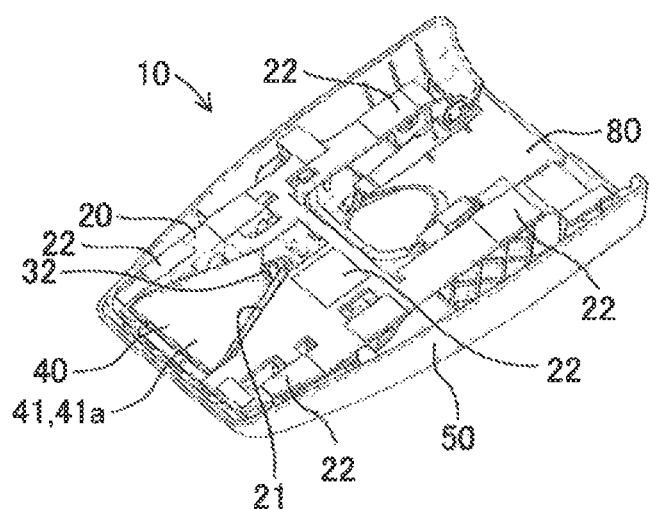
FIG. 3 is a perspective view of the photographing apparatus for vehicle as viewed from the above.
Figure 4:
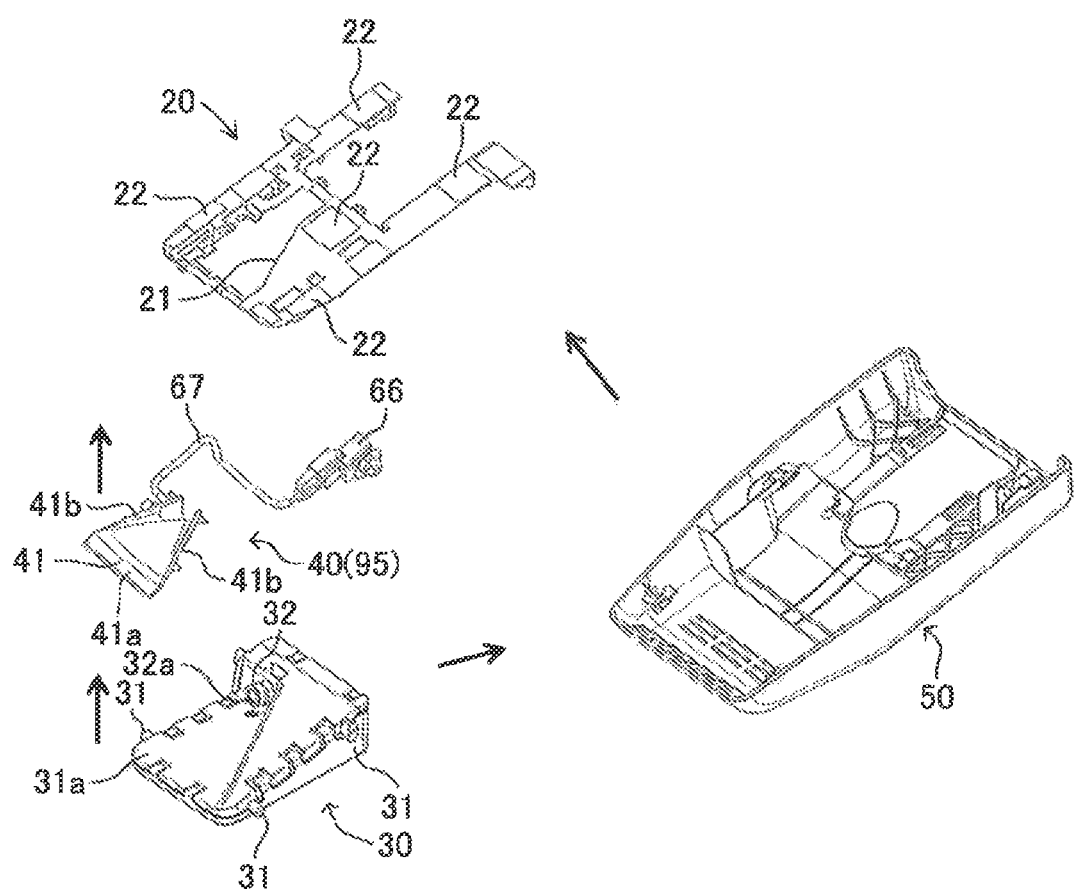
FIG. 4 is an exploded perspective view of the photographing apparatus for vehicle as viewed from the above.

As shown in FIGS. 3 and 4, the photographing apparatus 10 includes a bracket 20, a camera unit 30, a light shielding and heating unit 40, and a cover 50 as main components.

The bracket 20 is made from a hard resin. A support portion 21, which is substantially trapezoidal through hole, is formed in the bracket 20. Further, a plurality of adhesive surfaces 22 are formed on the upper surface of the bracket 20.

The camera unit 30 includes a housing 31 and an image pickup unit 32. The housing 31 is an integrally molded product made from resin and constitutes the outer shape of the camera unit 30. A hood mounting recess 31a having a substantially trapezoid shape in a plan view is formed on the upper surface of the housing 31. The image pickup unit 32 is fixed to the rear end surface of the hood mounting recess 31a. As shown in FIG. 2, the image pickup unit 32 includes a lens 32a and an image pickup device 32b positioned immediately behind the lens 32a. The image pickup device 32b is a compound eye type device. The image pickup device 32b receives reflected light (photographing light), which is reflected backward by an obstacle located in front of the camera unit 30 and passes through the lens 32a. The upper portion of the camera unit 30 is engaged with the bracket 20 and is supported by the bracket 20. Noted that, a thermistor 30a (see FIG. 9), which can detect the temperature Tc of the camera unit 30, is provided inside the camera unit 30.

The light shielding and heating unit 40 shown in FIGS. 4 to 8 (particularly, FIG. 5) is provided with a light shielding hood 41, a double-faced adhesive tape 42, a heater module 43, a fuse module 44, a heat insulator 45 and a cable module 46 as main components.

The light shielding hood 41 is an integrally molded product made from a hard resin. The light shielding hood 41 includes a heated portion 41a and side wall portions 41b. The heated portion 41a is a plate having an equilateral triangular shape (that is, the heated portion 41a has an equilateral triangular shape in the front view). The heated portion 41a is bilaterally symmetrical with respect to the center line L1 extending in the front-rear direction. The side wall portions 41b are a pair of flange portions extending upward from left and right side edge portions of the heated portion 41a, respectively. The height of each side wall portion 41b gradually increases from the front end thereof to the rear end thereof.

The heater module 43 includes a PET sheet 43a and a heater 43b.

The PET sheet 43a is made from PET (polyethylene terephthalate). The outer shape of the PET sheet 43a is substantially the same shape as that of the heated portion 41a. That is, the PET sheet 43a is an equilateral triangle bilaterally symmetrical with respect to the center line L1. The PET sheet 43a has good insulating property.

The heater 43b is a heating wire made from a metal (for example, brass) that generates heat when receiving electricity. The heater 43b is formed on substantially the entire upper surface of the PET sheet 43a by printing in a zig-zag manner. Both end portions of the heater 43b are constituted by a pair of lands 43c and 43d having larger area than the other portions of the heater 43b. The lands 43c, 43d are exposed on the upper and lower surfaces of the PET sheet 43a. The land 43c is provided in the vicinity of the rear corner of the PET sheet 43a, and the land 43d is provided in the vicinity of front right corner of the PET sheet 43a.

The lower surface of the double-faced adhesive tape 42 is attached to the upper surface of the PET sheet 43a so as to cover the heater 43b. The double-faced adhesive tape 42 has substantially the same shape as the heated portion 41a and the PET sheet 43a. The upper surface of the double-faced adhesive tape 42 is attached to the lower surface of the heated portion 41a. As a result, the heater module 43 is fixed to the light shielding hood 41. The double-faced adhesive tape 42 has good thermal conductivity. The peripheral edge portion of the PET sheet 43a overlaps the peripheral edge portions of the double-faced adhesive tape 42 and the heated portion 41a.

The fuse module 44 is integrally provided with a double-faced adhesive tape 44a, a fuse 44b and two lead wires 44c, 44d.

Figure 5:
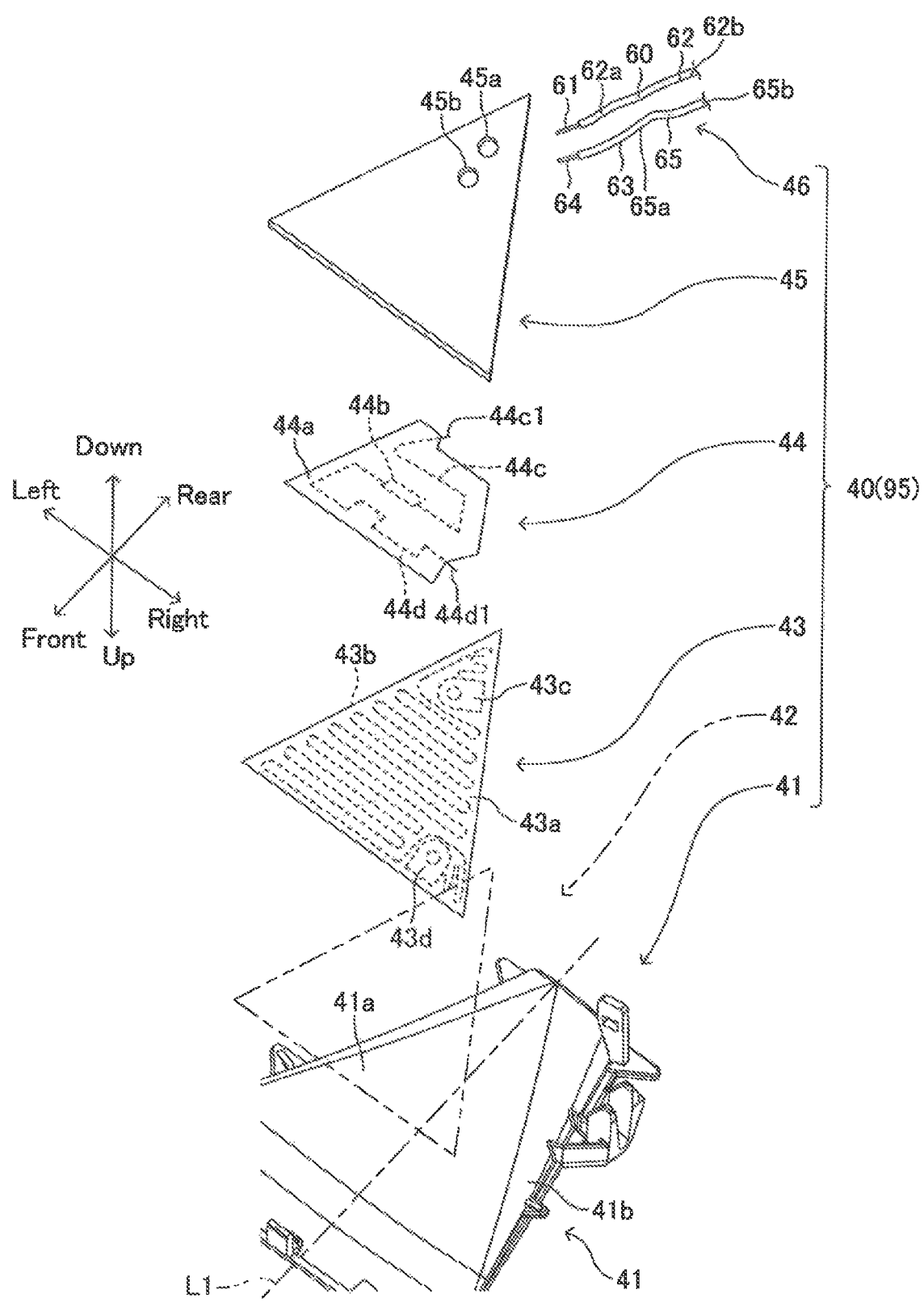
FIG. 5 is an exploded perspective view of a light shielding and heating unit as viewed from the below.

The double-faced adhesive tape 44a is a sheet-like member having a shape shown in FIG. 5, and both surfaces of the double-faced adhesive tape 44a are adhesive surfaces. The thermal conductivity of the double-faced adhesive tape 44a is lower than those of the light shielding hood 41, the double-faced adhesive tape 42, and the PET sheet 43a.

The fuse 44b is a current limiting element, and includes a cylindrical insulating case and a soluble metal which has conductivity. The soluble metal is provided inside the insulating case and is fixed to the insulating case. The insulating case of the fuse 44b is attached to the substantially central portion of the upper surface of the double-faced adhesive tape 44a.

The two lead wires 44c, 44d are attached to the upper surface of the double-faced adhesive tape 44a in the illustrated manner. One end of each of the two lead wires 44c, 44d is located in the insulating case of the fuse 44b. The one end of the lead wire 44c is connected to one end of the soluble metal, and the one end of the lead wire 44d is connected to the other end of the soluble metal. On the other hand, connecting ends 44c1, 44d1, which are the other ends of the two lead wires 44c, 44d, are both located on the outer peripheral side with respect to the double-faced adhesive tape 44a.

Figure 7:
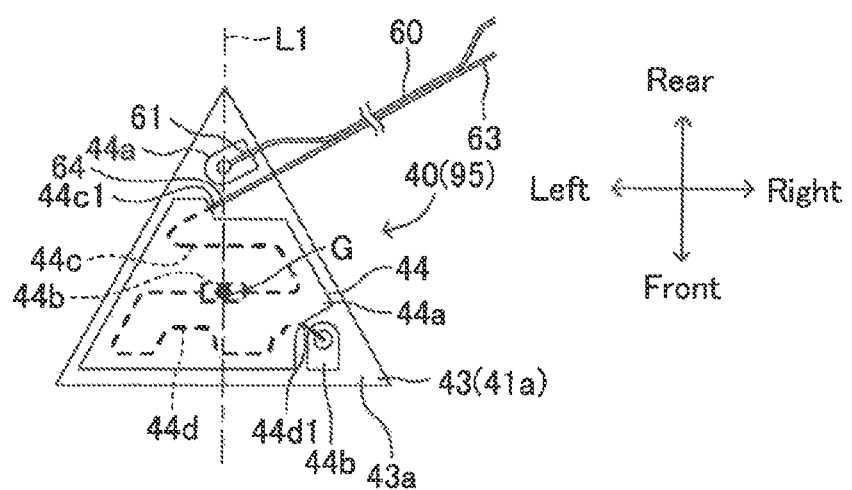
FIG. 7 is a schematic view of a heated portion, a heater module, a fuse module, and a cable module as viewed from the below.

The upper surface of the double-faced adhesive tape 44a is attached to the lower surface of the PET sheet 43a. As a result, the fuse module 44 is fixed to the heater module 43. As shown in FIG. 7, the entire fuse module 44 is located on the inner peripheral side with respect to the outer peripheral edge portion of the PET sheet 43a. The pair of the lands 43c, 43d of the heater module 43 are located on the outer peripheral side with respect to the double-faced adhesive tape 44a. Furthermore, as shown in FIG. 7, the fuse 44b of the fuse module 44 is located at a position overlapping the position of the center of gravity G of the heated portion 41a in the thickness direction of the heated portion 41a. That is, the fuse 44b is arranged on a straight line, which extends in the thickness direction of the heated portion 41a and passes through the center of gravity G.

The fuse 44b and the lead wires 44c, 44d (except for the connecting ends 44c1, 44d1) are in contact with the lower surface of the PET sheet 43a. That is, the fuse 44b and the lead wires 44c, 44d (except for the connecting ends 44c1, 44d1) and the portion of the heater 43b excluding the lands 43c, 43d are insulated from each other by the PET sheet 43a positioned therebetween. Further, the connecting end 44d1 of the lead wire 44d is soldered to the lower surface of the land 43d of the PET sheet 43a (not shown).

The heat insulator 45 is made from an insulating material, and has substantially the same shape as the heated portion 41a. That is, the heat insulator 45 is an equilateral triangular sheet-like member. A pair of through-holes 45a, 45b are formed in the vicinity of the rear end corner of the heat insulator 45. The thermal conductivity of the heat insulator 45 is lower than those of the light shielding hood 41, the double-faced adhesive tape 42, the PET sheet 43a, and the double-faced adhesive tape 44a.

The upper surface of the heat insulator 45 is attached to the lower surface of the double-faced adhesive tape 44a. A portion of the upper surface of the heat insulator 45, which does not face the double-faced adhesive tape 44a, is in contact with the lower surface of the PET sheet 43a. The peripheral portion of the heat insulator 45 is in contact with a portion of the light shielding hood 41 which is positioned on the outer peripheral side with respect to the peripheral portions of the heated portion 41a and the PET sheet 43a. In addition, the through-holes 45a, 45b of the heat insulator 45 are located on the center line L1 when viewed in the thickness direction of the heated portion 41a. When the heat insulator 45 is fixed to the double-faced adhesive tape 44a, the through-hole 45a is located immediately below the land 43c of the PET sheet 43a and the through-hole 45b is located immediately below the connecting end 44c1 of the lead wire 44c.

As shown in FIGS. 5 to 9, the cable module 46 is provided with a first electric cable 60, a second electric cable 63, a connector 66 (see FIGS. 4 and 9) connected to one end of the first electric cable 60 and one end of the second electric cable 63, and a banding tube 67.

The first electric cable 60 includes an electric wire 61 made of a metal wire having good conductivity and a covering tube 62 covering the outer peripheral surface of the electric wire 61 excluding the outer peripheral surface of both end portions thereof. Similarly, the second electric cable 63 includes an electric wire 64 made of a metal wire having good conductivity and a covering tube 65 covering the outer peripheral surface of the electric wire 64 excluding the outer peripheral surface of both end portions thereof.

Two metallic contacts (not shown) are provided inside the connector 66. One of the two contacts is an anode and the other of the two contacts is a cathode. One end of the first electric cable 60 and one end of the second electric cable 63 are connected to the connector 66. One end of the electric wire 61 is connected to one contact which is the anode and one end of the electric wire 64 is connected to the other contact which is the cathode.

Figure 6:
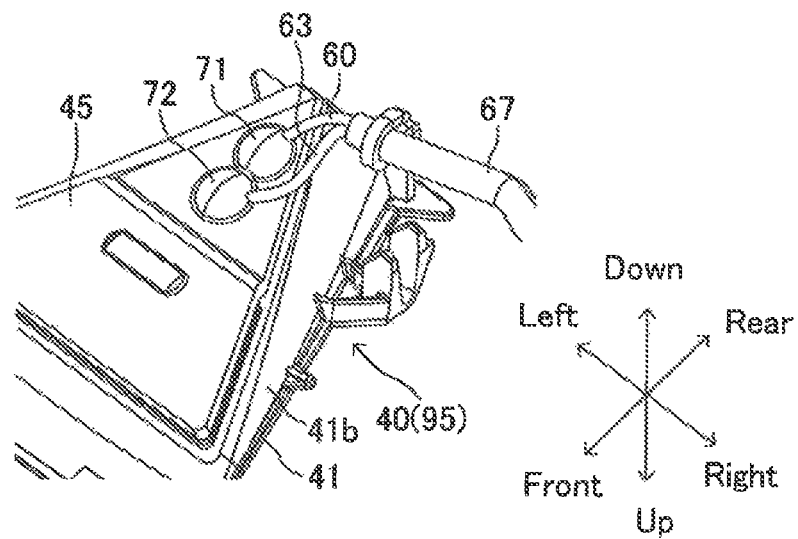
FIG. 6 is a perspective view of the light shielding and heating unit as viewed from the below.

Further, as shown in FIGS. 4 and 6, portions of the covering tube 62 and the covering tube 65, which are different from the front and rear end portions thereof, are inserted into the single banding tube 67. That is, the banding tube 67 bundles the covering tube 62 and the covering tube 65 so as not to separate from each other.

Figure 8A:
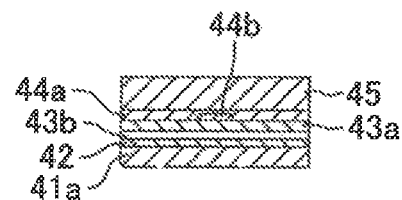
FIG. 8a is a cross-sectional view of the light shielding and heating unit when being cut at a position passing through the fuse.
Figure 8B:
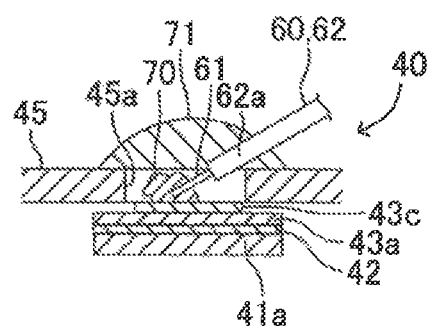
FIG. 8b is a cross-sectional view of the light shielding and heating unit when being cut at a position passing through a sealant.

As shown in FIG. 8B, the other end of the electric wire 61 of the first electric cable 60 is inserted into the through-hole 45a of the heat insulator 45, and the other end of the electric wire 61 is connected to the lower surface of the land 43c by a solder 70. Although illustration is omitted, the other end of the electric wire 64 of the second electric cable 63 is inserted into the through-hole 45b of the heat insulator 45. The other end of the electric wire 64 and the connecting end 44c1 of the lead wire 44c are soldered to each other.

As shown in FIGS. 6, 8A, and 8B, a sealant 71 having electrical insulation property is fixed to the lower surface of the heat insulator 45 and a fixed portion 62a (shown in FIGS. 5 and 8B) that is the vicinity of the through-hole 45a side end of the covering tube 62 of the first electric cable 60. The through-hole 45a is covered with this sealant 71. Similarly, as shown in FIG. 6, a sealant 72 having electrical insulation property is fixed to the lower surface of the heat insulator 45 and a fixed portion 65a (shown in FIG. 5) that is the vicinity of the through-hole 45b side end of the covering tube 65 of the second electric cable 63. The through-hole 45b is covered with this sealant 72.

As shown in FIGS. 3 and 4, the light shielding hood 41 of the light shielding and heating unit 40 is fitted into the hood mounting recess 31a of the camera unit 30, and the front portion of the image pickup unit 32 is located directly above the rear end portion of the heated portion 41a through a gap between the rear end portions of the left and right side wall portions 41b. Further, as shown in FIGS. 2 and 3, the light shielding hood 41 of the light shielding and heating unit 40 is fitted into the support portion 21 of the bracket 20, and the upper surface of the cover 50 is fixed to the bracket 20 so as to cover the camera unit 30 and the light shielding and heating unit 40.

The connector 66 of the cable module 46 is drawn backward of the cover 50 through the rear end opening of the cover 50.

As shown in FIGS. 1 and 2, the photographing apparatus 10, which is integrated in this way, is fixed to the vehicle interior side surface of the forward extending portion 86a of the light shielding sheet 86 by using adhesive (not shown) applied to each adhesive surface 22 of the bracket 20. Then, the support portion 21 of the bracket 20, the heated portion 41a of the light shielding and heating unit 40, and the image pickup unit 32 of the camera unit 30 are positioned at positions facing the light transmission hole 86b of the light shielding sheet 86. Accordingly, photographing light, which is directed from the front side of the front window 85 to the rear side of the front window 85 and passes through the light transmission portion 85a and the light transmission hole 86b of the light shielding sheet 86 backward, is received by the image pickup device 32b after passing through the lens 32a of the image pickup unit 32.

Figure 9:
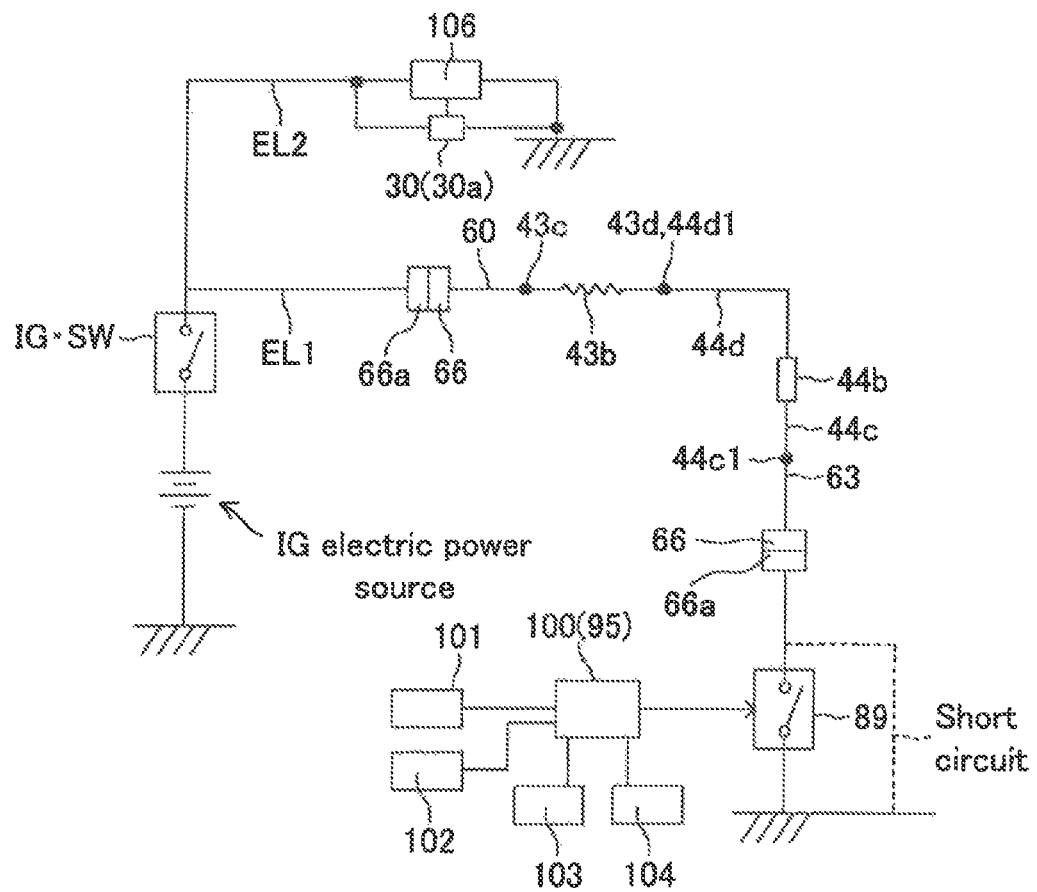
FIG. 9 is a schematic view of an electrical circuit.

As shown in FIG. 9, the vehicle is provide with an electric control device (not shown, hereinafter referred to as "control device") 100. The control device 100 is an ECU. ECU is an abbreviation of Electric Control Unit, and is provided with a microcomputer including a CPU and a storage device such as a ROM and a RAM. The CPU implements various functions by executing instructions (programs) stored in the ROM. A "low speed duty ratio calculation map (MapLo)", a "high speed duty ratio calculation map (MapHi)", and a "duty ratio correction map (MapD)" are stored in the storage device (ROM) of the control device 100.

Further, the vehicle is provided with an outside air temperature sensor 101 for measuring a temperature Tair outside of the vehicle. The outside air temperature sensor 101 is provided in a front grill of the vehicle. Further, the vehicle is provided with a vehicle speed sensor 102, an interior air temperature sensor 103, and an air conditioner operating condition detection device 104. The outside air temperature sensor 101, the vehicle speed sensor 102, the interior air temperature sensor 103, and the air conditioner operating condition detection device 104 are connected to the control device 100. The air conditioner operating condition detection device 104 generates an operating condition value Sc (described later) which is a value indicating the operation condition of an air conditioner (not shown) of the vehicle.

As shown in FIG. 9, the connector 66 of the light shielding and heating unit 40 is connected to a vehicle body side connector 66a provided in the vehicle body. Actually, the connector 66 and the vehicle body side connector 66a are integrated members. However, in FIG. 9, the connector 66 and the vehicle body side connector 66a are drawn in a manner that the connector 66 and the vehicle body side connector 66a are divided into two pieces in order to be easy to understand the connection relation.

More specifically, the first electric cable 60 is connected to an anode of a vehicle installation electric power source (i.e., an IG electric power source or battery) via the connector 66, the vehicle body side connector 66a, an electrical supply line EL1, and an ignition switch (IG-SW). A cathode of the IG electric power source is grounded. The second electric cable 63 is connected to one end of a switch element 89 via the connector 66 and the vehicle body side connector 66a. The other end of the switch element 89 is grounded. The state of the switch element 89 is switched between an ON state (i.e., conduction state or connection state) and an OFF state (i.e., non-conduction state or disconnection state) by the control device 100. In this embodiment, the switch element 89 is a semiconductor switch element, however, the switch element 89 may be a relay type switch.

Further, one end of an electrical supply line EL2 is connected to the ignition switch (IG-SW). The other end of the electrical supply line EL2 is connected to a power supply line (not shown) of a camera control ECU 106. An earth line (not shown) of the camera control ECU 106 is grounded. As a result, the camera control ECU 106 is supplied with electricity from the IG electric power source. In addition, a power supply line (not shown) of the camera unit 30 is connected to the electrical supply line EL2, and an earth line (not shown) of the camera unit 30 is grounded. As a result, the IG electric power source supplies the camera unit 30 with electricity. The camera control ECU 106 and the camera unit 30 are connected to each other so as to transmit and receive various signals therebetween. Although not shown, the control device 100 is also connected to the IG electric power source via the IG-SW, and receive electricity from the IG electric power source. Further, the control device 100 and the camera control ECU 106 are configured to be capable of transmitting and receiving information therebetween via a CAN (not shown).

The camera control ECU 106 detects the voltage Vh (the potential of the electrical supply line EL2) of electricity supplied to the camera control ECU 106. This voltage Vh is substantially equal to the voltage Vp of the IG electric power source. Furthermore, when the state of the switch element 89 is in the conduction state, the voltage Vh of electricity supplied to the heater 43b is substantially equal to the voltage Vp of the IG electric power source. Therefore, the voltage Vh detected by the camera control ECU 106 is used as the voltage (heater voltage) Vh of electricity supplied to the heater 43b.

The light shielding and heating unit 40 and the control device 100 described above are components of the heating device 95.

(Operation)

Next, the operations of the vehicle and the photographing apparatus 10 will be described. When an ignition key (not shown) is operated, the ignition switch (IG-SW) is closed and thus the anode of the IG electric power source is made to be connected to the electrical supply line EL1, the electrical supply line EL2, and the control device 100. As a result, the camera control ECU 106 causes the camera unit 30 to start imaging. The camera unit 30 acquires imaging data using the image pickup unit 32 each time a predetermined period of time elapses.

More specifically, the image pickup device 32b of the image pickup unit 32 captures reflected light, which is reflected backward by an object (for example, another vehicle) positioned in front of the vehicle having the photographing apparatus 10 and passes through the light transmission portion 85a of the front window 85, the light transmission hole 86b of the light shielding sheet 86, and the lens 32a, to generate imaging data. The camera unit 30 transmits the imaging data to the camera control ECU 106. The camera control ECU 106 processes the imaging data received from the camera unit 30, and transmits it to the control device 100 each time a predetermined period of time elapses. By analyzing the received imaging data, the control device 100 acquires information (forward information) on an object (other vehicle, obstacle, etc.) existing in front of the vehicle, and controls the vehicle based on the forward information.

For example, based on the forward information, the control device 100 executes "automatic brake control, lane keeping assist control (i.e., lane tracing assist control), adaptive high beam control" and the like, executes automatic operation, and issues an alarm. Hereinafter, such a control based on forward information is referred to as driving support control.

Furthermore, when the ignition switch is closed, during the operation of an engine, operations of the outside air temperature sensor 101, the vehicle speed sensor 102, the interior air temperature sensor 103, and the air conditioner operating condition detection device 104, operation of the thermistor 30a for detecting the temperature Tc of the camera unit 30, and operation of the camera control ECU 106 for detecting voltage are repeatedly carried out at predetermined time intervals. When the engine is operating, the outside air temperature sensor 101, the vehicle speed sensor 102, the interior air temperature sensor 103, the air conditioner operating condition detection device 104, and the camera control ECU 106 (the thermistor 30a) continue to output signals relating to detection results to the control device 100.

Meanwhile, when the outside air temperature (i.e., air temperature outside of the vehicle) is low, dew condensation may occur on the light transmission portion 85a of the front window 85. Dew condensation is easy to occur when an air heating device is used in the passenger compartment. Furthermore, when the outside air temperature is low, ice and/or frost may adhere to the light transmission portion 85a. If such a phenomenon occurs, the imaging data generated by the image pickup device 32b may be data representing a blurred object image, and/or the image pickup unit 32 may fail to image an object in front of the vehicle. In such a case, the control device 100 may fail to accurately perform the above-described driving support control using imaging data. Thus, the control device 100 prevents such a situation from occurring by executing the processing (routine) shown by the flowchart of FIG. 10. It should be noted that the control device 100 sets the switch element 89 to the OFF state immediately after the ignition key switch is changed from an OFF position to an ON position.

The CPU of the control device 100 (hereinafter simply referred to as "CPU") starts the processing of the routine shown in FIG. 10 from Step 1000 every time a predetermined period of time T (see FIG. 11. It is set to 3 minutes in the present embodiment.) elapses. Thereafter, the CPU proceeds to Step 1001 to determine whether or not the outside air temperature Tair detected by the outside air temperature sensor 101 at a predetermined time immediately before the start of the processing of this routine is lower than a predetermined outside air temperature threshold Tath. When the outside air temperature Tair is equal to or higher than the predetermined outside air temperature threshold Tath, "a possibility that dew condensation occurs on the light transmission portion 85a" and "a possibility that ice and/or frost adhere to the light transmission portion 85a" are extremely low. Therefore, in this case, the CPU determines "No" in Step 1001, and proceeds to Step 1007 to set the switch element 89 to the OFF state (i.e., to stop supplying electricity to the heater 43b). Thereafter, the CPU directly proceeds to Step 1095 and temporarily ends this routine. As a result, the state of the switch element 89 is maintained in the OFF state, so that the heater 43b does not generate heat.

On the other hand, when the outside air temperature Tair is lower than the predetermined outside air temperature threshold Tath, the CPU determines "Yes" in Step 1001, and proceeds to Step 1002 to determine whether or not a vehicle speed SPD detected by the vehicle speed sensor 102 at the predetermined time immediately before the start of the processing of this routine is equal to or higher than a predetermined speed threshold SPDth. The control device 100 executes the driving support control based on the imaging data generated by the camera unit 30 when the vehicle speed SPD is equal to or higher than the speed threshold SPDth. Therefore, when the vehicle speed SPD is less than the speed threshold SPDth, the imaging data is not used, so it is not necessary to energize the heater 43b. Therefore, when the vehicle speed SPD is less than the speed threshold SPDth, the CPU determines "No" in Step 1002, and directly proceeds to Step 1095 via Step 1007. As a result, the switch element 89 is maintained in the OFF state, so that the heater 43b does not generate heat.

On the other hand, when the vehicle speed SPD is equal to or higher than the speed threshold SPDth, the CPU determines "Yes" in Step 1002 and proceeds to Step 1003. Noted that, Step 1002 can be omitted. In other words, the speed threshold SPDth can be "0 km/h". In this case, the CPU inevitably proceeds to Step 1003 regardless of the vehicle speed SPD. In Step 1003, the CPU determines whether or not the temperature Tc of the camera unit 30 detected by the thermistor 30a at the predetermined time immediately before the start of the processing of this routine is within a predetermined normal temperature range (i.e., a temperature range in which the operation of the camera unit 30 is guaranteed). When the temperature Tc of the camera unit 30 is not within the normal temperature range, the CPU determines "No" in Step 1003, and proceeds directly to Step 1095 via Step 1007. As a result, since the switch element 89 is maintained in the OFF state, the heater 43b does not generate heat.

On the other hand, when the temperature Tc of the camera unit 30 is within the normal temperature range, the CPU determines "Yes" in Step 1003, and proceeds to Step 1095 to temporarily end this routine after executing the processing of Steps 1004 to 1006 described below in that order. When the CPU determines "Yes" in all of Steps 1001 to 1003, a predetermined control start condition is satisfied.

Step 1004: First, the CPU determines whether the vehicle speed SPD detected by the vehicle speed sensor 102 at the predetermined time is included in a predetermined low speed area or in a predetermined high speed area. For example, the range of the low speed area can be set to 0 km/h or more and less than 50 km/h, and the range of the high speed area can be set to 50 km/h or more.

When the vehicle speed SPD is a vehicle speed included in the low speed area, the CPU selects the low speed duty ratio calculation map (MapLo) as a duty ratio calculation map (lookup table). Then, as shown in the following formula, the CPU calculates the duty ratio by applying the heater voltage Vh, the outside air temperature Tair and the vehicle speed SPD at the predetermined time as arguments to this map.

$$\text{Duty ratio} = \text{MaPLo}(Vh, Tair, SPD)$$

Figure 11:
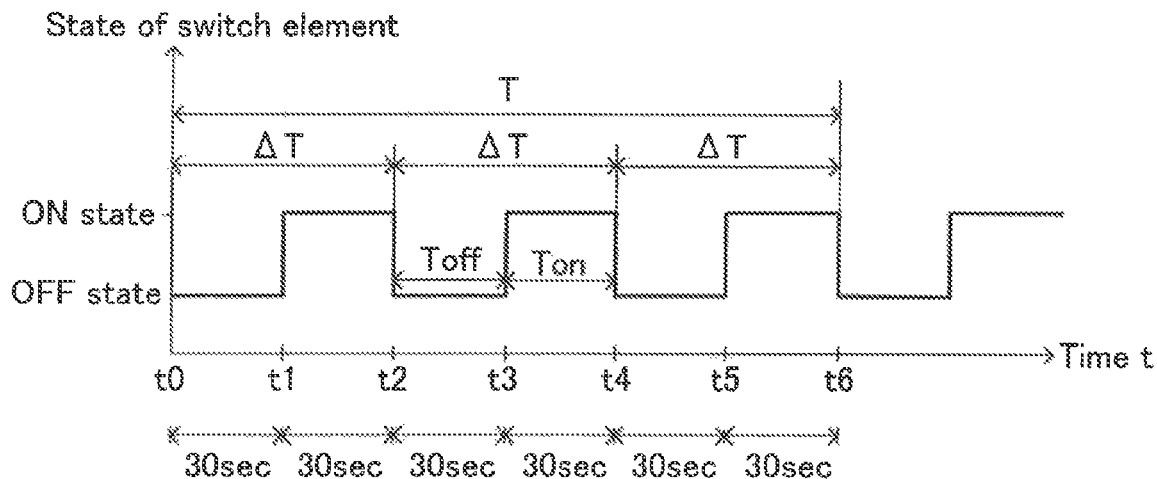
FIG. 11 is a graph showing a duty ratio when electricity is supplied to a heater.

As shown in FIG. 11, the duty ratio is a ratio (%) expressed by the following formula. Here, the period of time (voltage application time) during which the switch element 89 is in the ON state is defined as Ton, and the period of time (voltage application stop time) during which the switch element 89 is in the OFF state is defined as Toff. In this embodiment, assuming Ton+Toff=one cycle $\Delta T$, the predetermined period of time T is set to be three times as long as $\Delta T$ (i.e., $T = 3 \cdot \Delta T$). The larger the duty ratio becomes, the larger electric energy supplied to the heater 43b (i.e., electric energy consumed by the heater 43b) for the predetermined period of time T (i.e., total electric energy) becomes, and thus the heat generation amount of the heater 43b for the predetermined period of time T (i.e., total heat generation amount [J]) becomes larger.

$$\text{Duty ratio} = [Ton/(Ton+Toff)] \cdot 100 (\%)$$

On the other hand, when the vehicle speed SPD is a vehicle speed included in the high speed area, the CPU selects the high speed duty ratio calculation map (MapHi) as the duty ratio calculation map. Then, as shown in the following formula, the CPU calculates the duty ratio by applying the heater voltage Vh, the outside air temperature Tair and the vehicle speed SPD at the predetermined time as arguments to this map.

$$\text{Duty ratio} = \text{MaPHi}(Vh, Tair, SPD)$$

It should be noted that a target heat generation amount (the target value of the heat generation amount) can be calculated based on the outside air temperature Tair and the vehicle speed SPD, and the duty ratio can be calculated based on the target heat generation amount and the voltage Vh.

According to an experiment, it was found that when the temperature of the heater 43b is maintained within a predetermined temperature range (hereinafter referred to as "an appropriate temperature range"), "the occurrence of dew condensation on the light transmission portion 85a and the adherence of ice and frost etc to the light transmission portion 85a" can be avoided. Noted that when the temperature of the heater 43b is maintained within the appropriate temperature range, the temperature of the light transmission portion 85a can be maintained at "temperature within the predetermined range which is equal to or higher than the dew point temperature". It is assumed that this is the reason why the occurrence of dew condensation and the adherence of ice and frost can be avoided.

On the other hand, the temperature of the heater 43b has a strong correlation with the heat generation amount generated by the heater 43b and the amount of heat escaping from the heater 43b for a predetermined period of time (i.e., the predetermined period of time T of this embodiment). Furthermore, the amount of heat escaping from the heater 43b has a strong correlation with a heat radiation amount of the light transmission portion 85a. The heat radiation amount of the light transmission portion 85a for a predetermined period of time has a strong correlation with "the outside air temperature Tair and the vehicle speed SPD". Therefore, the heater voltage Vh at the predetermined time, the outside air temperature Tair at the predetermined time and the vehicle speed SPD at the predetermined time are used as arguments of the low speed duty ratio calculation map (MapLo) and the high speed duty ratio calculation map (MapHi).

The low speed duty ratio calculation map (MapLo) and the high speed duty ratio calculation map (MapHi) may be integrated into one duty ratio calculation map (MapCo (Vh, Tair, SPD)). Hereinafter, when there is no need to distinguish the low speed duty ratio calculation map (MapLo) and the high speed duty ratio calculation map (MapHi), these maps are called a duty ratio calculation map. A duty ratio calculated in accordance with the duty ratio calculation map is a value corresponding to a target value of "the heat generation amount (supplied electric energy) of the heater 43b for the predetermined period of time T" which is necessary for maintaining the temperature of the heater 43b within the appropriate temperature range. Therefore, the duty ratio calculation map is obtained (made) based on a relationship between the three factors (i.e., the heater voltage Vh, the outside air temperature Tair, the vehicle speed SPD) and the duty ratio necessary for maintaining the temperature of the heater 43b within the appropriate temperature range, and is stored in the ROM. This relationship is obtained in advance by an experiment.

The duty ratio becomes smaller as the heater voltage Vh becomes higher, regardless of whether the low speed duty ratio calculation map (MapLo) or the high speed duty ratio calculation map (MapHi) is used.

The duty ratio becomes smaller as the outside air temperature Tair becomes higher, regardless of whether the low speed duty ratio calculation map (MapLo) or the high speed duty ratio calculation map (MapHi) is used.

When the heater voltage Vh and the outside air temperature Tair are predetermined constant values respectively, the duty ratio obtained by the high speed duty ratio calculation map (MapHi) is larger than the duty ratio obtained by the low speed duty ratio calculation map (MapLo). Furthermore, the duty ratio becomes larger as the vehicle speed SPD becomes higher, regardless of whether the low speed duty ratio calculation map (MapLo) or the high speed duty ratio calculation map (MapHi) is used.

Step 1005: The CPU applies the temperature Tc of the camera unit 30 at the predetermined time and the duty ratio calculated in Step 1004 to the duty ratio correction map (MapD), thereby calculating a corrected duty ratio which is a corrected value of the duty ratio (see the following formula). The duty ratio correction map MapD is obtained (made) based on a relationship between the two factors (i.e., the duty ratio and the temperature Tc of the camera unit 30) and the corrected duty ratio necessary for maintaining the temperature of the heater 43b within the appropriate temperature range, and is stored in the ROM. This relationship is obtained in advance by an experiment. By using the duty ratio correction map (MapD), the duty ratio is corrected so as to become smaller as the temperature Tc of the camera unit 30 becomes higher, and the corrected value is calculated as the corrected duty ratio.

Corrected duty ratio=Map$D$(duty ratio,$Tc$)

Step 1006: The CPU executes energization control (heat generation amount control) of the heater 43b over the predetermined period of time T according to the corrected duty ratio. That is, as shown in FIG. 11, the CPU repeats a switching operation three times (see the times t0 to t6). In each of the switching operations, the CPU sets the switch element 89 to the OFF state over the voltage application stop time Toff defined by the corrected duty ratio, and then sets the switch element 89 to the ON state over the voltage application time Ton defined by the corrected duty ratio. Thereafter, when the predetermined period of time T elapses from the time at which the processing of Step 1001 is started, the CPU restarts this routine from Step 1000.

Meanwhile, even when the energization control of the heater 43b is executed over the predetermined period of time T in accordance with the duty ratio calculated in Step 1004 (i.e., the duty ratio calculated based on the duty ratio calculation map), the temperature of the heater 43b may become higher than the appropriate temperature range. One factor causing this phenomenon is the heat generated by the camera unit 30.

More specifically, the heat generated by the camera unit 30 reaches the heater 43b via the heated portion 41a and the double-faced adhesive tape 42. Therefore, the temperature of the heater 43b is affected by the amount of heat transmitted from the camera unit 30 to the heater 43b. In other words, the temperature of the heater 43b has a strong correlation with the temperature Tc of the camera unit 30. Therefore, in order to maintain the temperature of the heater 43b within the appropriate temperature range, "the amount of heat transmitted from the camera unit 30 to the heater 43b" represented by the temperature Tc of the camera unit 30 has to be considered.

Then, as described above, in Step 1005, the CPU corrects the duty ratio based on the temperature Tc of the camera unit 30 at the predetermined time to calculate the corrected duty ratio which is actually used for the energization control, and executes the energization control of the heater 43b using the corrected duty ratio.

As a result, the photographing apparatus for vehicle according to the present embodiment can maintain the temperature of the heater 43b within the appropriate temperature range regardless of the degree of the amount of the heat generated by the camera unit 30. As a result, the photographing apparatus for vehicle can reduce the possibility of "the occurrence of dew condensation on the light transmission portion 85a and the adherence of ice and frost etc to the light transmission portion 85a", and can reduce the possibility that the temperature of the heater 43b becomes excessively high temperature which considerably exceeds the appropriate temperature range. Therefore, it is possible to reduce the possibility of thermal deformation of a component (for example, the PET sheet 43a) located in the vicinity of the heater 43b.

In the case where the electrical circuit does not include the fuse 44b, when a short circuit (ground fault) occurs in the electrical circuit in the "short circuit" manner of FIG. 9, electricity of the IG electric power source is supplied to the heater 43b even when the control device 100 sets the switch element 89 to the OFF state. That is, in this case, the electricity of the IG electric power source is continuously supplied to the heater 43b for a long time. Therefore, the heater 43b, the heated portion 41a, and the peripheral portion thereof become excessively hot.

However, the photographing apparatus 10 of the present embodiment is provided with the fuse 44b provided on the electrical circuit. The soluble metal of the fuse 44b is heated by the heat transmitted from the heater 43b via the lead wires 44c, 44d and the heat transmitted from the heated portion 41a.

When a short circuit occurs in the electrical circuit in the "short circuit" manner in FIG. 9, the heater 43b and the heated portion 41a become high temperature. Then, the temperature of the fuse 44b becomes a temperature equal to or more than a predetermined value, and thus the fuse 44b is blown (melted). Then, since the electricity of the IG electric power source fails to be supplied to the heater 43b, the heater 43b, the heated portion 41a, and the peripheral portion thereof are prevented from becoming excessively hot.

Modified Embodiment

Figure 10:
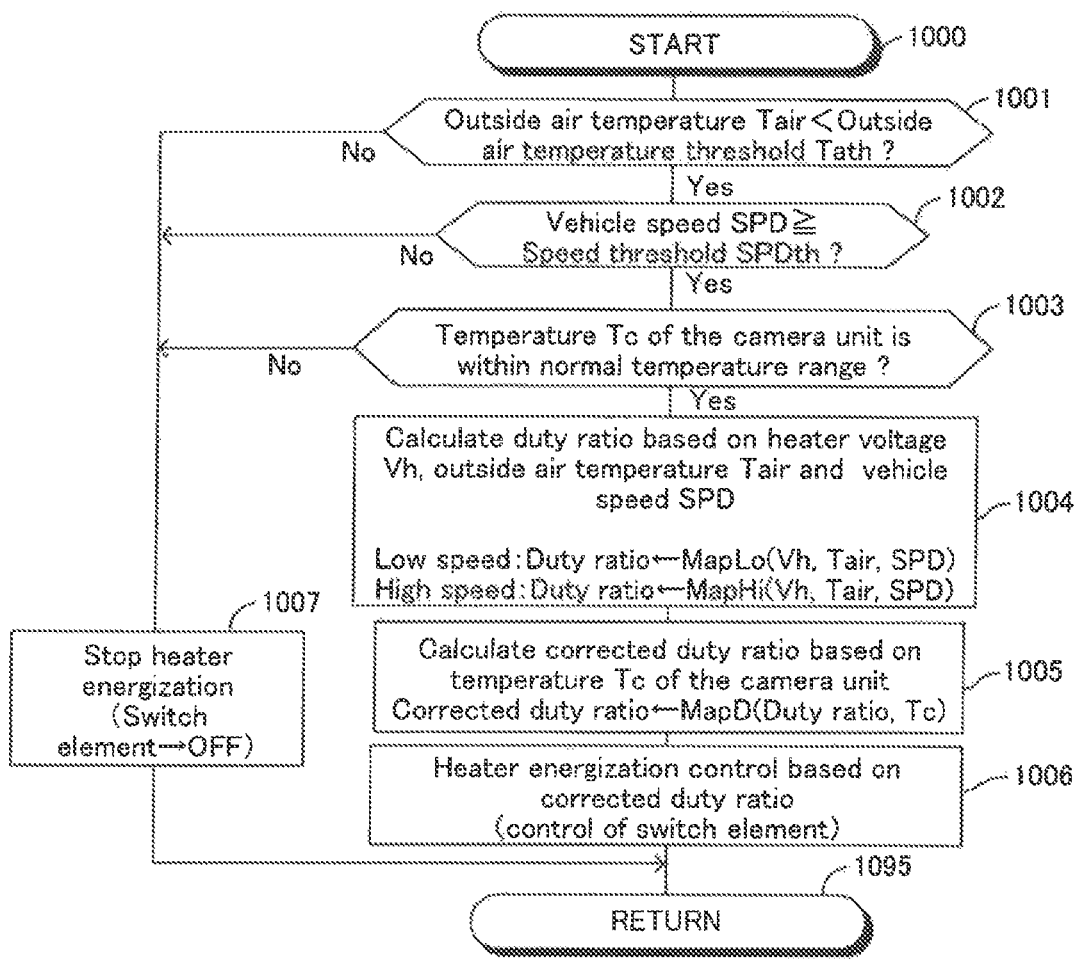
FIG. 10 is a routine showing processing executed by a control device.
Figure 12:
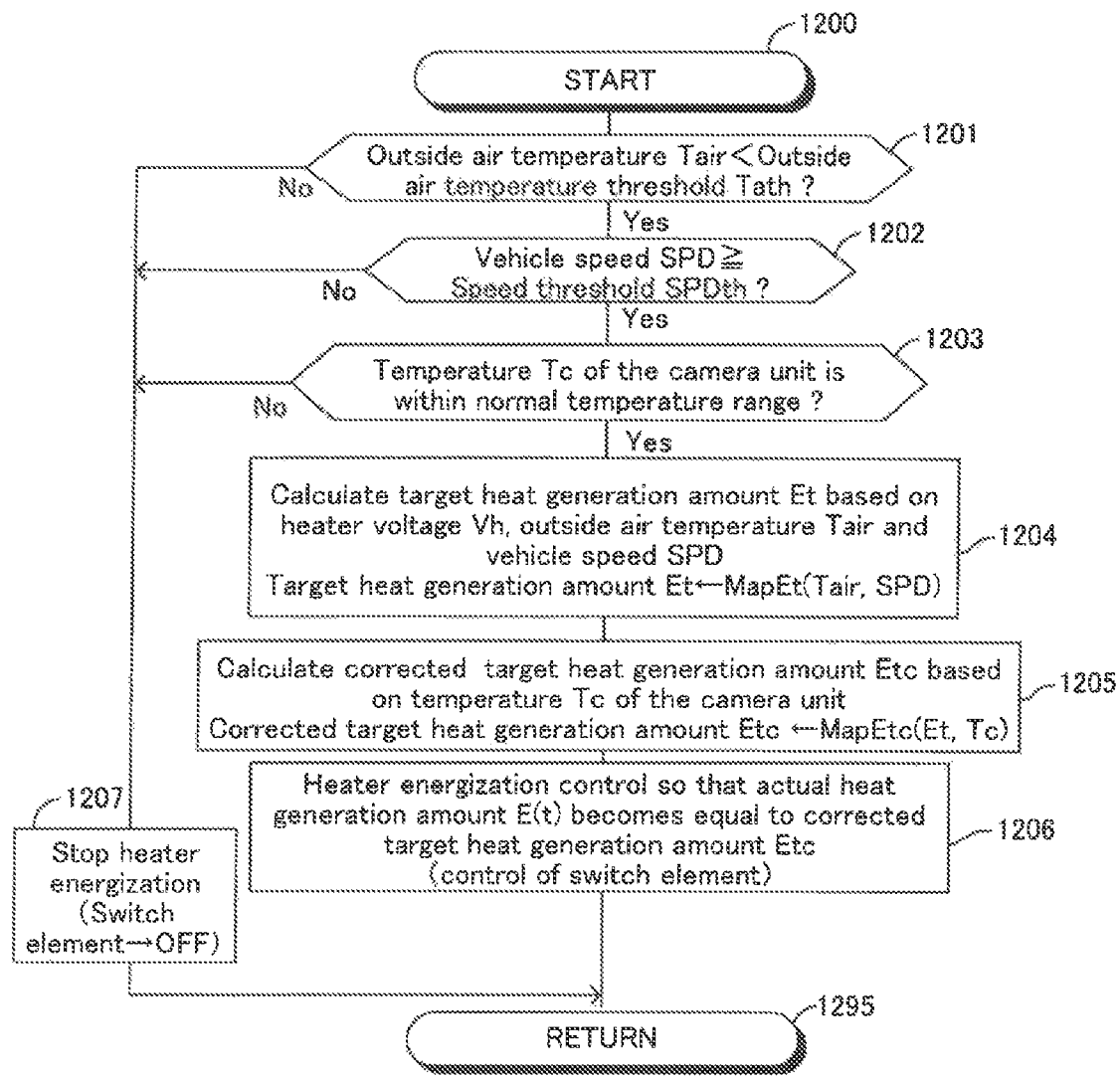
FIG. 12 is a routine showing processing executed by the control device according to a modified embodiment of the present invention.

For example, the CPU of the control device 100 according to the modified embodiment of the present invention may execute the routine shown by the flowchart of FIG. 12 every time the predetermined period of time T elapses instead of the flowchart of FIG. 10. Steps 1201, 1202, and 1203 of this flowchart are the same as Steps 1001, 1002, and 1003, respectively. Therefore, descriptions about these steps will be omitted.

When the CPU determines "Yes" in Step 1203, the CPU executes the processing in Step 1204 described below.

Step 1204: As shown in the following formula, the CPU applies the outside air temperature Tair and the vehicle speed SPD at the predetermined time as arguments to a target heat generation amount calculation map (look-up table) MaPEt stored in the ROM of the control device 100 to calculate a target heat generation amount Et. The target heat generation amount Et is a target value of "the heat generation amount of the heater 43b (i.e., supplied electric energy) for the predetermined period of time T" which is necessary for maintaining the temperature of the heater 43b within the appropriate temperature range.

Target heat generation amount $Et=\mathrm{MaP}Et(Tair,SPD)$

Meanwhile, as described above, the temperature of the heater 43b is affected by the temperature Tc of the camera unit 30. However, the target heat generation amount calculation map (MaPEt) is made without considering the temperature Tc of the camera unit 30 (i.e., the amount of heat exerts on the heater 43b from the camera unit 30). Therefore, the CPU sequentially executes the processing of Step 1205 and Step 1206 described below, and proceeds to Step 1295 to temporarily end this routine.

Step 1205: The CPU applies the temperature Tc of the camera unit 30 at the predetermined time and the target heat generation amount Et calculated in Step 1204 to a target heat generation amount correction map (MaPEtc) to calculate a corrected target heat generation amount Etc which is a corrected value of the target heat generation amount Et (see the following formula). The target heat generation amount correction map (MaPEtc) is obtained (made) based on a relationship between the two factors (i.e., the target heat generation amount Et and the temperature Tc of the camera unit 30) and the corrected target heat generation amount Etc necessary for maintaining the temperature of the heater 43b within the appropriate temperature range, and is stored in the ROM. This relationship is obtained in advance by an experiment. By using the target heat generation amount correction map (MaPEtc), the target heat generation amount Et is corrected so as to become smaller as the temperature Tc of the camera unit 30 becomes higher, and the corrected value is calculated as the corrected target heat generation amount Etc.

Corrected target heat generation amount $Etc=\mathrm{Map}Etc(Et,Tc)$

Step 1206: The CPU executes energization control (heat generation amount control) of the heater 43b according to the corrected target heat generation amount Etc. More specifically, the CPU changes the switch element 89 from the OFF state to the ON state, thereby supplying electricity of the IG electric power source to the heater 43b to cause the heater 43b to generate heat. Further, the CPU calculates an actual heat generation amount (total heat amount, integrated value of heat amount) E(t) generated actually by the heater 43b from the time at which the switch element 89 is changed to the ON state based on the following formula (1). Noted that, "t" is time, "R" is the resistance value of the heater 43b, and "V" is the voltage of the heater 43b. The above-mentioned heater voltage Vh is used as "V".

$$E(t) = \frac{1}{R}\int_0^t V^2(t)dt \qquad \text{[Formula (1)]}$$

Further, in Step 1206, the CPU monitors whether or not the actual heat generation amount E(t) calculated based on the formula (1) reaches (i.e., becomes equal to or higher than) the corrected target heat generation amount Etc, and changes the switch element 89 from the ON state to the OFF state when the actual heat generation amount E(t) reaches the corrected target heat generation amount Etc. Thereafter, when the predetermined period of time T elapses from the time at which the processing of Step 1201 is started, the CPU restarts this routine from Step 1200.

Although the present invention has been described based on the embodiment and modified embodiment, the present invention is not limited to the above-described embodiment and modified embodiment, and various modifications can be made without departing from the object of the present invention.

For example, the temperature Tc of the camera unit 30 has a correlation with the heat generation amount generated by the camera unit 30 and an amount of solar radiation of natural light applied to the camera unit 30 via the light transmission portion 85a. Therefore, the camera control ECU 106 may calculate the temperature Tc of the camera unit 30 based on a heat generation amount generated by the camera unit 30, which is estimated by the thermistor 30a, and an amount of natural light transmitting through the lens 32a (i.e., an amount of solar radiation), which is detected by a light amount detection sensor provided inside the camera unit 30.

Further, the temperature of the heater 43b is affected by an interior air temperature Ti of the vehicle in addition to the temperature Tc of the camera unit 30. Therefore, the energization control of the heater 43b is preferably executed in consideration of the interior air temperature Ti of the vehicle.

More specifically, when the interior air temperature Ti detected by the interior air temperature sensor 103 is lower than a reference temperature T0 by a temperature dT, the temperature of the heater 43b is lowered by a predetermined amount corresponding to the temperature dT. Therefore, the target heat generation amount Et of the heater 43b has to be increased by an amount corresponding to this predetermined amount. For example, when a necessary increase of the target heat generation amount Et, which is caused by the interior air temperature Ti, is defined as $\Delta Ti=f(Ti)$, the final corrected target heat generation amount Etc is calculated by the following formula. The reference temperature T0 in this case is the interior air temperature at the time of obtaining the data as the basis of the target heat generation amount calculation map MaPEt and the target heat generation amount correction map MaPEtc. The CPU calculates the corrected target heat generation amount Etc according to the following formula and executes the energization control of the heater 43b based on the corrected target heat generation amount Etc.

Corrected target heat generation amount
$Etc$=corrected target heat generation amount $Etc$ calculated in Step 1205+$\Delta Ti$ Alternatively, the CPU may use the interior air temperature Ti as an argument of the duty ratio correction map (MapD) used in Step 1005. That is, the corrected duty ratio may be obtained by the following formula.

Corrected duty ratio=Map$D$(duty ratio,$Tc,Ti$)

Further, the temperature of the heater 43b is also affected by the operating condition value Sc which is a value indicating an operation condition of the air conditioner. Therefore, the energization control of the heater 43b is preferably executed in consideration of the operating condition value Sc. The operating condition value Sc is a value set in accordance with at least one of a set temperature, an air volume, and a direction of the wind of the air conditioner, and becomes larger as their influence degrees of lowering the temperature of the heater 43b become larger. For example, the operating condition value Sc becomes larger as the set temperature becomes lower. For example, the operating condition value Sc becomes larger as the air volume becomes larger. For example, when the wind flows to the heater 43*b*, the operating condition value Sc becomes larger compared with the case where the wind flows away from the heater 43*b*.

More specifically, when the operating condition value Sc is larger than a predetermined reference operating condition value Sc0 by a predetermined value dSc, the temperature of the heater 43*b* is lowered by a predetermined amount corresponding to the predetermined value dSc. Therefore, the target heat generation amount Et of the heater 43*b* has to be increased by this predetermined amount. For example, when a necessary increase of the target heat generation amount Et, which is caused by the operating condition value Sc, is defined as ΔSc=g(Sc), the final corrected target heat generation amount Etc is calculated by the following formula. The reference operating condition value Sc0 in this case is the interior air temperature at the time of obtaining the data as the basis of the target heat generation amount calculation map MaPEt and the target heat generation amount correction map MaPEtc.

Corrected target heat generation amount
Etc=corrected target heat generation amount Etc
calculated in Step 1205+ΔSc Alternatively, the CPU may use the operating condition value Sc as an argument of the duty ratio correction map (MapD) used in Step 1005. That is, the corrected duty ratio may be obtained by the following formula.

Corrected duty ratio=Map*D*(duty ratio,*Tc,Sc*)

Further, the CPU may use the interior air temperature Ti and the operating condition value Sc as arguments of the duty ratio correction map (MapD) used in Step 1005. That is, the corrected duty ratio may be obtained by the following formula.

Corrected duty ratio=Map*D*(duty ratio,*Tc,Ti,Sc*)

In this way, when the heater 43*b* is energized in consideration of the interior air temperature Ti and/or the operating condition value Sc, the possibility that the heat amount applied to the light transmission portion 85*a* by the heater 43*b* via the heated portion 41*a* becomes excessively small is reduced. Therefore, the possibility that dew condensation, ice, and frost on the light transmission portion 85*a* do not disappear is reduced.

Furthermore, in the above-described embodiment and the modified embodiments, instead of using the look-up tables, the duty ratio, the corrected duty ratio, the target heat generation amount Et, and the corrected target heat generation amount Etc may be calculated by using formulas having the arguments of the look-up tables as variables.

Furthermore, the CPU of the above embodiment may directly calculate the corrected duty ratio by using any one of the following lookup tables MaP1 to MaP4 instead of executing the processing of Step 1004 and Step 1005.

Corrected duty ratio=MaP1(*Vh,Tair,SPD,Tc*)

Corrected duty ratio=MaP2(*Vh,Tair,SPD,Tc,Ti*)

Corrected duty ratio=MaP3(*Vh,Tair,SPD,Tc,Sc*)

Corrected duty ratio=MaP4(*Vh,Tair,SPD,Tc,Ti,Sc*)

Similarly, the CPU of the modified embodiment described above may directly calculate the corrected target heat generation amount Etc by using any one of the following lookup tables MaP5 to MaP8 instead of executing the processing of Step 1204 and Step 1205.

Corrected target heat generation amount Etc=MaP5(*Vh,Tair,SPD,Tc*)

Corrected target heat generation amount Etc=MaP6(*Vh,Tair,SPD,Tc,Ti*)

Corrected target heat generation amount Etc=MaP7(*Vh,Tair,SPD,Tc,Sc*)

Corrected target heat generation amount Etc=MaP8(*Vh,Tair,SPD,Tc,Ti,Sc*)

The predetermined time may be a time at which the switch element 89 is switched from the OFF state to the ON state. In this case, the voltage Vp of the IG electric power source is equal to the voltage Vh of the heater 43*b*.

The photographing apparatus for the vehicle may be mounted to a window different from a front window. For example, a photographing apparatus for vehicle may be mounted to a back window of a vehicle so that an obstacle located behind the vehicle can be detected by this photographing apparatus for vehicle.

What is claimed is:

1. A photographing apparatus for vehicle comprising;
    a photographing apparatus that is disposed inside a vehicle so as to face a window of the vehicle and is configured to receive photographing light passing through a light transmission portion of the window;
    heating means that is disposed inside the vehicle so as to face the window and generates heat when receiving electricity;
    an outside air temperature detector that detects outside air temperature which is air temperature outside of the vehicle;
    a vehicle speed sensor that detects vehicle speed; and
    a control device that calculates a target value of electric energy to be supplied to the heating means for a predetermined period of time and supplies electric energy corresponding to the target value to the heating means;
    wherein the control device is configured to:
        calculate an amount of electric energy to be supplied to the heating means for the predetermined period of time, based on the outside air temperature and the vehicle speed; and
        calculate a corrected amount as the target value by correcting the calculated amount, based on a temperature of the photographing apparatus to maintain the temperature of the heating means within a predetermined temperature range to avoid occurrence of dew condensation on the light transmission portion and/or adherence of ice and/or frost to the light transmission portion.

2. The photographing apparatus for vehicle according to claim 1, wherein the heating means comprises:
    a heater, being a heating wire, generating heat when receiving electricity; and
    a heated portion to which the heater is fixed, the heated portion releasing radiation heat to the window when receiving heat from the heater.

3. The photographing apparatus for vehicle according to claim 1, wherein:
    the photographing apparatus comprises an interior air temperature detector that detects interior air temperature which is air temperature inside of the vehicle; and
    the control device is configured to increase the target value by an amount corresponding to a temperature which is obtained by subtracting the interior air temperature from a reference temperature.

4. The photographing apparatus for vehicle according to claim 1, wherein:
   the photographing apparatus comprises an air conditioner operating condition detector that detects operating condition of an air conditioner provided in the vehicle; and
   the control device is configured to change the target value by an amount corresponding to the operating condition of the air conditioner.

5. A heating device disposed inside a vehicle so as to face a light transmission portion of a window of the vehicle together with a photographing apparatus, the heating device comprising:
   heating means that generates heat when receiving electricity;
   a vehicle speed sensor that detects vehicle speed; and
   a control device that calculates a target value of electric energy to be supplied to the heating means for a predetermined period of time and supplies electric energy corresponding to the target value to the heating means;
   wherein the control device is configured to:
      calculate an amount of the electric energy to be supplied to the heating means for the predetermined period of time, based on the outside air temperature and the vehicle speed; and
      calculate a corrected amount as the target value by correcting the calculated amount, based on a temperature of the photographing apparatus to maintain the temperature of the heating means within a predetermined temperature range to avoid occurrence of dew condensation on the light transmission portion and/or adherence of ice and/or frost to the light transmission portion.

* * * * *